United States Patent [19]
Mejyr et al.

[11] 3,785,361
[45] Jan. 15, 1974

[54] GAS BURNER DEVICE FOR FOOD GRILLING

[75] Inventors: Carl-Anker Mejyr; Lars Eric Ledin, both of Sundbyberg, Sweden

[73] Assignee: Primus-Sievert AB, Vretenvagen, Solna, Sweden

[22] Filed: Oct. 4, 1972

[21] Appl. No.: 294,831

[30] Foreign Application Priority Data
Oct. 15, 1971 Sweden.............................. 13094/71

[52] U.S. Cl. ............................ 126/41 R, 126/25 R
[51] Int. Cl. ............................................ A47j 37/00
[58] Field of Search............... 126/41 R, 25 R, 25 A

[56] References Cited
UNITED STATES PATENTS
3,593,647  7/1971  Copeland, Jr..................... 126/41 R
3,667,449  6/1972  Persinger et al. ................. 126/41 R
3,688,758  9/1972  Stephen, Jr. ...................... 126/41 R Primary Examiner—Edward G. Favors
Attorney—Herbert Cohen et al.

[57] ABSTRACT

A gas burner device for food grilling and operating with LNG, said device comprising a burner body mounted on a vertical axis in a casing, which is cup-shaped and open upwardly and which supports a grill grate, said device further comprising a flame holder device consisting of a flame holder wall extending from below the burner gas discharge openings and towards the casing periphery and an apertured flame holder screen located above said burner body but below the grill grate.

3 Claims, 1 Drawing Figure

PATENTED JAN 15 1974   3,785,361
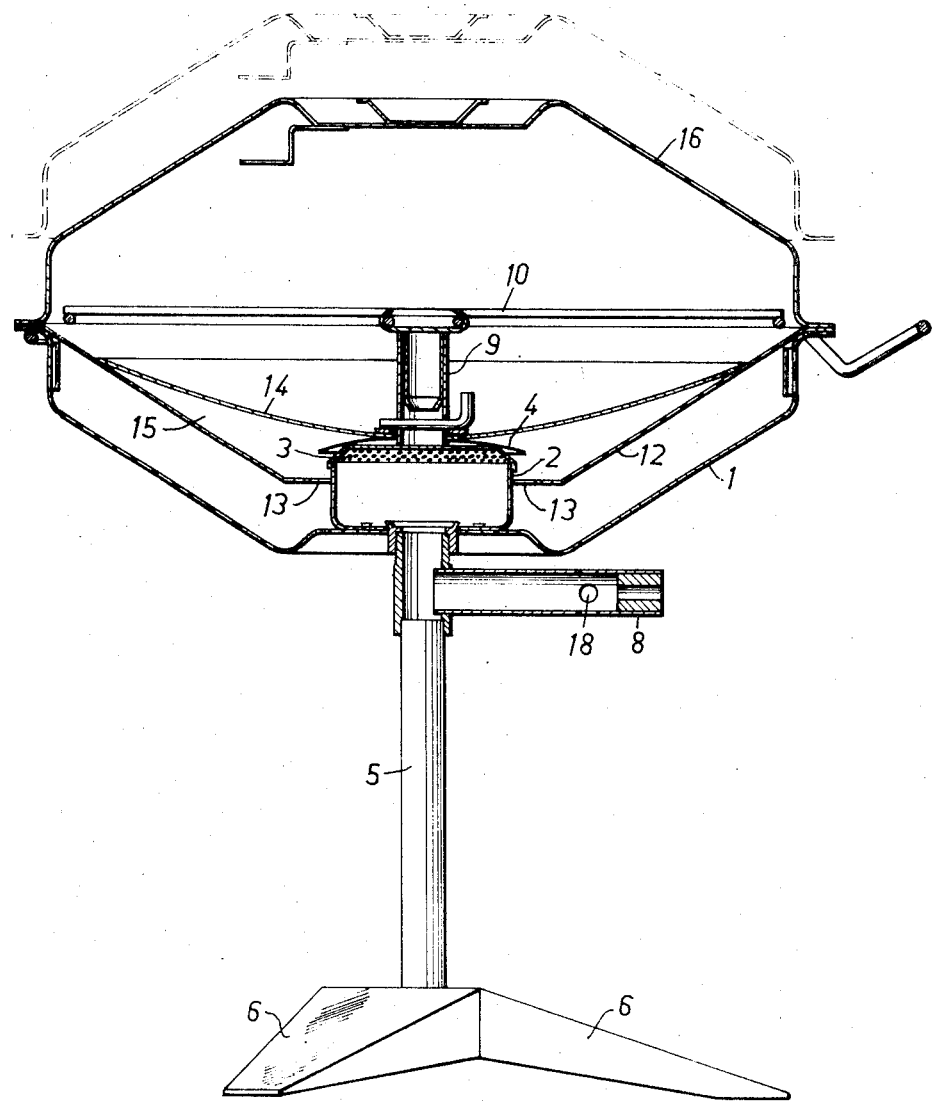

GAS BURNER DEVICE FOR FOOD GRILLING

The present invention refers to a gas burner device, particularly a burner device operating with liquified natural gas (such as LPG, or the like) and adapted for grilling of foodstuffs, said device comprising a burner body preferably circular in shape and mounted centrally with its axis vertical in a surrounding casing, also preferably being circular and cup-shaped and open upwardly, said casing supporting a grill grate space above the burner body.

Devices for grilling of edibles or food-stuffs such as meat and fish have recently got an increasing popularity. Most often, such grill devices have been constituted by a cup-shaped casing with a fire grate carrying a bed of charcoal and a grill grate located thereabove and adapted for supporting the edibles to be grilled. However, since such grill devices are time-consuming to utilize when not using particularly prepared charcoal, so-called grill coal, which however is expensive, attempts have been made, instead to fire similar grill devices with gaseous fuels, particularly liquified petroleum gases, thus so-called bottle gas or similar fuels. In doing so, difficulties have arisen, however, in that the flames from the burning bottle gas cannot be made to spread over any particular large area and particularly not an area of such magnitude that grilling is made possible.

The object of the present invention is to provide a grill device which eliminates said drawbacks.

Such a grill device now is suggested according to the present invention, and the distinctive features of said device substantially are a flame holder device, consisting of (i) a flame holder wall extending from a location below the gas discharge openings of said burner body and inclined upwardly and outwardly towards the periphery of said casing and (ii) an apertured flame holder screen located above the burner body but below the grill grate, said screen extending outwardly into engagement with the flame holder wall adjacent the periphery of the casing so as to form a flame chamber having decreasing vertical dimension from the burner body and towards the periphery of the casing for assuring a uniform and extended flame area required for grilling.

By way of example, the invention will be further described below with reference to the accompanying drawing, which illustrate a lateral view in section of a grill with a gas burner device according to the present invention.

With reference to the drawings, the device comprises a cup-shaped and upwardly open casing 1 which preferably has circular shape but of course also can have any other suitable peripheral contour. Centrally in this casing 1 is mounted a burner body 2 which preferably also has circular shape. Around the upper portion of the burner body 2 is located a suitable number of gas discharge openings 3 and above the burner is situated a drop protection hood 4, extending somewhat beyond the burner periphery. The casing 1 with the central burner body 2 is supported by a pillar stand 5 resting on the ground by means of legs 6. At short distance from the casing 1 the tubular pillar stand 5 is provided with a connexion piece 8 for connexion with a suitable source (not illustrated) for the gas to be burned. From the upper surface of the burner 2 preferably also extends upwardly a central extension 9 for supporting a grill grate 10.

According to the present invention, the gas burner device described is provided with a flame holder device providing a very beneficial and specific action and consisting of on one hand a flame holder wall 12 and on the other a flame holder screen 14. Said flame holder wall 12 extends from a position below the gas discharge openings 3 of the burner body 1 and is inclined upwardly and outwardly towards the periphery of the casing 1. Furthermore, said flame holder wall 12 closely adjacent the burner body 1 is provided with inlet openings 13 for the air required for the combustion. The flame holder screen 14 in its turn is apertured and arranged above the burner body 1 but below the grill grate 10 and extends outwardly into engagement with the flame holder wall 12 in the proximity of the periphery of the casing. Owing to this, a flame chamber 15 is provided, which has decreasing vertical dimension from the burner body 2 and outwardly towards the periphery of the casing 1 and which is entirely filled with the flames. Owing to this, it is assured a hitherto impossible uniform and wide spreading of the flames to an area required for grilling, since the flame holder screen 14 will be heated over a wide annular zone which will serve as secondary heat radiation source.

The detail design of the grill device in its entirety of course can be varied within wide limits and the same also applies to the shape of the very flame holder device with its flame holder wall and screen. Important is only what the flame holder wall 12 has a concave shape as seen from above and preferably is manufactured as a frustrated conical piece of sheet metal having an apex angle of about 120°. Furthermore it is essential that the flame holder screen is made of a flame-resistant, i.e. scale-free metal material, but its characteristics can vary. Thus the flame holder screen 14 can be made as a net of extended sheet metal, a gauze of metal wire, a perforated metal sheet or the like. The free area of the mesh openings in the flame holder screen can be within so wide limits as 3–20 mm$^2$ without jeopardizing the beneficial flame-holding effect.

For protecting the device when the same is not in use, the casing is adapted to be covered by a removable lid 16 and in a simplified embodiment of the structure it is possible by a modified design to let the flame holder wall 12 simultaneously constitute the casing 1 or the bottom wall of the gas burner device. Although other embodiments of course lie within the scope of the invention, the opening 13 in the flame holder wall 12 only is intended for the supply of secondary air for the combustion, corresponding openings of course being made also in the casing 1, while primary air is supplied through holes 18 in the connexion piece 8.

We claim:

1. A gas burner device, particularly a burner device operating with liquified natural gas (LNG), such as LPG, "bottle gas," or the like, and adapted for grilling of food-stuffs, said device comprising a burner body preferably circular in shape and mounted centrally with its axis vertical in a surrounding casing, also preferably being circular and cup-shaped and open upwardly, said casing supporting a grill grate spaced above the burner body, characterised by a flame holder device consisting of (i) a flame holder wall extending from a location below the gas discharge openings of said burner body and inclined upwardly and outwardly towards the periphery of said casing and (ii) an apertured flame holder screen located above the burner body but below the grill grate, said screen extending outwardly into engagement with the flame holder wall adjacent the periphery of the casing so as to form a flame chamber having decreasing vertical dimension from the burner body and towards the periphery of the casing for assuring a uniform and extended flame area required for grilling.

2. A device according to claim 1, characterised in that the flame holder wall (12) is made as a frusto-conical sheet metal piece having an apex angle of about 120°.

3. A device according to claim 1, characterised in that the flame holder screen (14) is made of extended sheet metal.

* * * * *